(12) United States Patent
Rokvic

(10) Patent No.: US 8,695,938 B1
(45) Date of Patent: Apr. 15, 2014

(54) GLASS CLIP

(71) Applicant: Ilija Rokvic, Independence, KY (US)

(72) Inventor: Ilija Rokvic, Independence, KY (US)

(73) Assignee: R.I.W. Ornamental Mental Inc, Wilder, KY (US)

( * ) Notice: Subject to any disclaimer, the term of this patent is extended or adjusted under 35 U.S.C. 154(b) by 0 days.

(21) Appl. No.: 13/646,709

(22) Filed: Oct. 7, 2012

(51) Int. Cl.
*A47F 7/14* (2006.01)
*E06B 3/00* (2006.01)

(52) U.S. Cl.
USPC ................................... 248/475.1; 248/488

(58) Field of Classification Search
CPC .................................................... A47G 1/215
USPC .......... 248/475.1, 488, 490, 345.1; 52/204.58
See application file for complete search history.

(56) References Cited

U.S. PATENT DOCUMENTS

| | | | | |
|---|---|---|---|---|
| 1,664,543 A | * | 4/1928 | Easterman | 52/204.58 |
| 2,699,668 A | * | 1/1955 | Stein | 52/204.58 |
| 2,771,262 A | * | 11/1956 | Laystrom | 248/489 |
| 2,951,668 A | * | 9/1960 | Peterka | 248/466 |
| 4,055,285 A | * | 10/1977 | Bott | 224/326 |
| 4,627,201 A | * | 12/1986 | Hamamoto et al. | 52/208 |
| 5,337,988 A | * | 8/1994 | Kurtz | 248/477 |
| 2012/0151811 A1 | * | 6/2012 | Ivall | 40/745 |

FOREIGN PATENT DOCUMENTS

DE 0783070 B1 * 11/1996

* cited by examiner

*Primary Examiner* — Anita M King
(74) *Attorney, Agent, or Firm* — Neal O. Willmann

(57) ABSTRACT

Glass clips comprising a pair of opposed planar elements separated and joined by fasteners to an attachment means are employed to grasp, support or suspend a plate glass from a stable structure such as a rail, post or flooring. The suspended glass creates a transparent wall or bather that is valued for its expansive and uncluttered visual effect. Glass clips employed in this manner can be more decorative, less functional and contribute to the overall aesthetics and ambience of the setting when a concealing cap conforming generally to the dimensions of the opposed planar elements and configured to slidably engage with one of the planar elements to envelope the surface of that element and conceal any fasteners used to join the elements.

3 Claims, 3 Drawing Sheets

GLASS CLIP

FIELD OF THE INVENTION

This invention relates to glass clips that are routinely employed in the construction industry to enable and assist in the installation of plate glass for purposes of structure and décor. Typically, glass clips are employed to suspend or support plates of glass from railings, posts or flooring to create transparent or translucent walls or barriers. Transparent walls or barriers provide a feeling of unencumbered openness that architects and designers favor to maximize the feeling of elegance, and grandeur in the public access areas of government and commercial buildings.

DESCRIPTION OF THE PRIOR ART

Glass clips similar to the clip-described herein are currently being used throughout the world to support or suspend plate glass from structural supports, primarily in interior environments. The clips are employed to grasp a sheet of glass at selected points along the perimeter of the sheet and then attach to structural features such as rails, posts or flooring. The clip is typically fashioned from opposing planar elements that grasp and "sandwich" the glass between the elements, which are then secured, one to the other, by one or more fasteners.

An attachment means separates and joins the opposing planar elements. The attachment means provides a medium or structural shoulder extending from one or both planar elements for enabling the fasteners to join one planar element to the other and a shoulder, for attaching the fastened clip and grasped or "sandwiched" plate of glass to a rail, post or floor. FIG. 1 illustrates a typical glass clip.

As previously described, plate glass is, preferentially employed architecturally not only for structural purposes, but also for visual enhancements. It is generally recognized that plate glass walls or barriers free-up and de-clutter the over-all appearance of lobbies, stairways and balconies. Because the visual effect of a glass wall or barrier is generally more important than its function, it should be understood and appreciated that the clips securing or suspending the glass plate should appear to be structurally inconspicuous, or visually neutral and do nothing to detract from the desired décor. Typically, the clips are forged machined or tooled from fine metals that offer a visually pleasing polished or matted finish. And generally speaking, anything that can be done to improve the visual quality and appearance of the clip will be well-received by the industry. One such improvement is described herein.

SUMMARY OF THE INVENTION

Specifically disclosed herein is a glass clip for the attachment of a sheet of plate glass to a stable or stabilizing structure. The glass clip generally comprises a pair of opposed planar elements, each having proximal and distal ends, inner and outer surfaces and a pair of lateral edges. However, the lateral edges of one of the planar elements are grooved and there is at least one threaded perpendicular hole or opening though this grooved element near its proximal end for the insertion of at least one fastener for joining the opposed elements.

Additionally, there is an attachment means joined to the planar elements and positioned between the proximal ends of the planar elements and separating the elements by a predetermined distance. The attachment means enables the joining of the planar elements by one or more fasteners and facilitates the attachment of the fastened clip to a stable structure by providing a structural shoulder emanating from the proximal ends of one or both of the planar elements.

The improvement in the disclosed glass clip resides in a concealing cap having a topside, an underside, proximal and distal ends and a pair of lateral edges, wherein the concealing cap conforms generally with the dimensions and shape of the grooved planar element and wherein the lateral edges are configured to mate with the grooved edges of the planar element and slidably envelope the element and thereby conceal the existence of the fastener(s) joining the elements.

DESCRIPTION OF THE PREFERRED EMBODIMENTS

Figure 1:
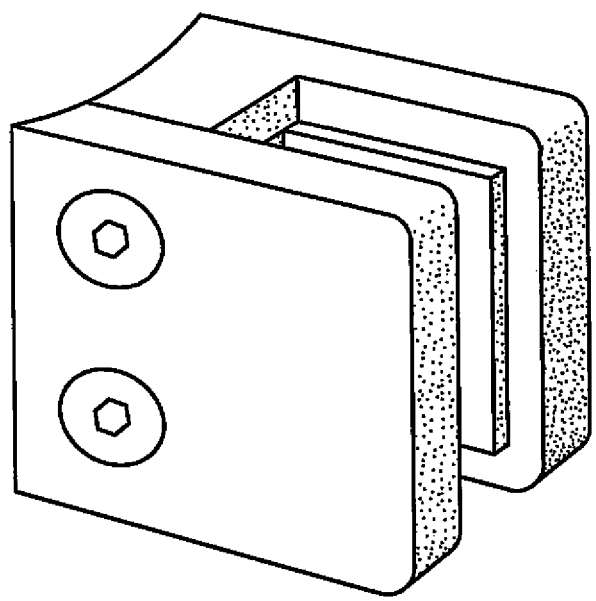
FIG. 1 is a perspective view depicting a glass clip currently in use in the industry.
Figure 2:
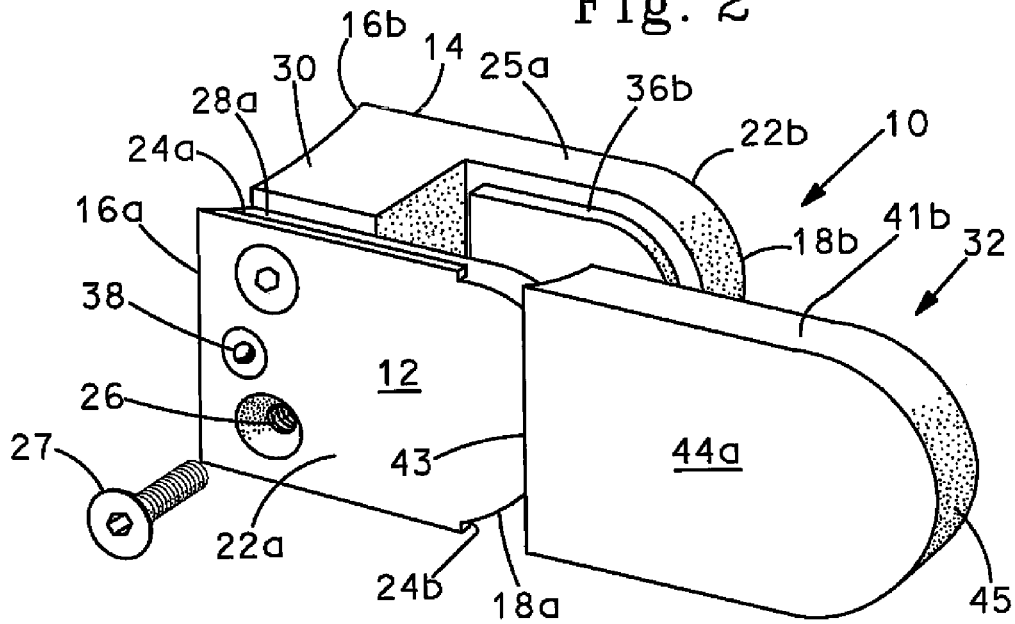
FIG. 2 is a perspective view of the improved clip depicting all the elements of the disclosed glass clip.

An appreciation of the disclosed glass clip 10 is facilitated and enhanced by reference to the drawing. As previously stated, FIG. 1 depicts a typical glass clip that is currently used to attach and stabilize a sheet of plate glass to a secure structure. The elements of the prior art clip will be readily apparent from the description of the instantly claimed clip. Typically, the secure structure to which the clip and the grasped glass plate are attached is a rail, a post or flooring. FIG. 2 depicts the improved glass clip 10 of this invention.

The improved glass clip includes a pair of opposed planar elements 12 and 14. Each planar element has a proximal end 16a and 16b and a distal end 18a and 18b, an outer surface 22a and 22b, an inner surface that is hidden by other elements, and a pair of lateral edges 24a, 24b and 25a and 25b. Preferably, all paired lateral edges are parallel. In use, a sheet of plate glass is positioned between the inner surfaces of opposed planar elements 12 and 14. To enhance the grip of the clip 10 on the glass, the clip is preferably fitted with a pair of resilient elastomeric pads 36a and 36b, which are readily apparent in FIG. 3. The pads are typically fabricated from a rubber or silicone material and generally positioned in concavities molded or machined in the inner surfaces of the planar elements. The resilient pads essentially cover, thus hide, the inner surfaces of the planar elements.

Also apparent from FIG. 2 are fastening elements for joining one planar element to the other while ensuring their grip on the glass plate. Typically, the fastening elements need be no more than a threaded fastener 27 and a threaded hole or bore 26 for inserting a threaded fastener 27 that extends from the outer surface 22a of one planar element into the opposing planar element to secure the assembly of the clip 10. In most instances, a pair of fasteners is used to attach one planar element to the other and secure or "sandwich" the plate of glass.

To provide for the attachment of the clip 10 to a stable structure before the glass is secured within the clip, the clip also includes an attachment means 30. Of necessity and as a practical matter, the attachment means is positioned between the proximal ends 16a and 16b of the planar elements and functions to separate and join the planar elements as well as to provide a structural means or shoulder to facilitate the attachment of the clip 10 to a secured structure. The attachment means 30 typically has a transverse hole 37 or opening for the insertion of a fastener for attaching the assembled clip to a stable structure. The attachment means 30 can be a unitary element of the clip, or preferably an integral part of either or both planar elements. The only requirements are that the attachment means separate the planar elements to provide for the insertion of the glass plate between them and provide structural means for the attachment of the clip to a stable structure.

In the glass clip 10 according to the drawing, the planar element 12 has a pair of threaded bores for the insertion of threaded fasteners for joining the opposing planar elements and also features grooves 28a and 28b in lateral edges 24a and 24b.

Figure 3:
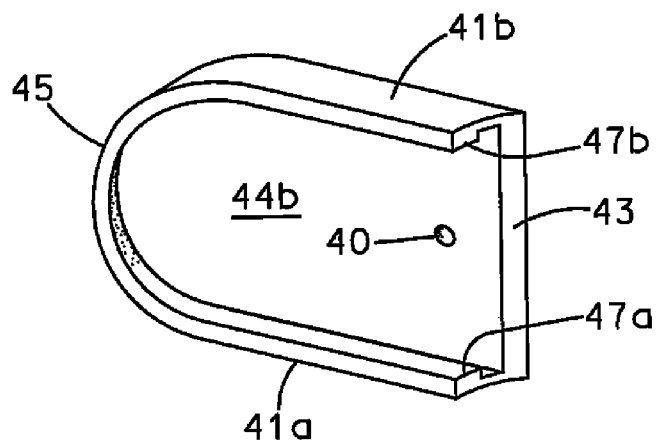
FIG. 3 is a perspective view of the concealing cap depicted in FIG. 2 rotated about a vertical axis.

The essential and distinguishing element of the improved glass clip as disclosed herein is the concealing cap 32, depicted in FIG. 3. The concealing cap conforms generally to the shape and dimensions of grooved planar element 12 and is configured by machining or molding to slidably engage with grooves 28a and 28b on planar element 12. The concealing cap 32 has an outer surface 44a and an inner surface 44b, it has proximal 43 and distal 45 ends, and a pair of lateral edges 41a and 41b. Both of its lateral edges 41a and 41b are configured to mate with the grooved edges 28a and 28b of planar element 12. Currently, the configured lateral edges 41a and 41b feature ribs 47a and 47b that fit neatly within grooves 28a and 28b. When slidably engaged with the grooves of the planar element, the concealing cap 32 envelopes planar element 12 and conceals the fasteners 27 used to join planar element 12 to planar element 14.

The resulting glass clip 10 is aesthetically pleasing. All visible exterior surfaces of the clip are free of any evidence that a fastener is used to effect assembly of the clip. The outer surface 44a of the concealing cap is preferably identical to the unmarred, non-functional outer surface 22b of planar element 14 and the clip is remarkable for its symmetry, visual uniformity and intriguing design.

Figure 4:
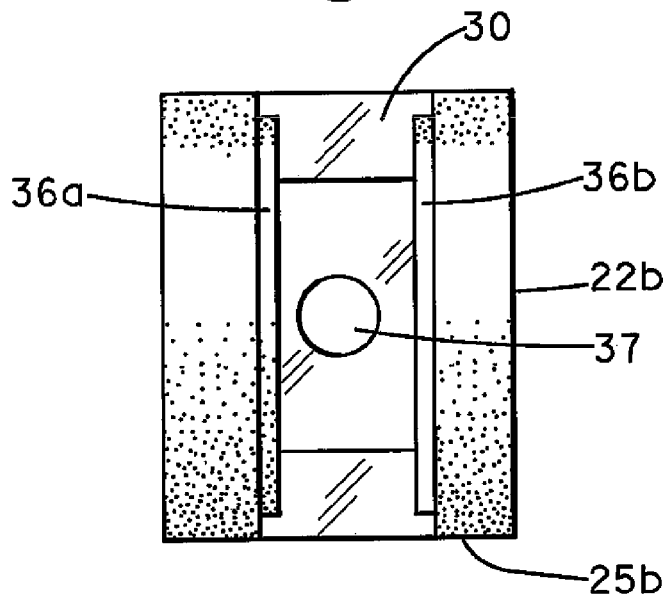
FIG. 4 is an elevated distal end of the improved clip.
Figure 5:
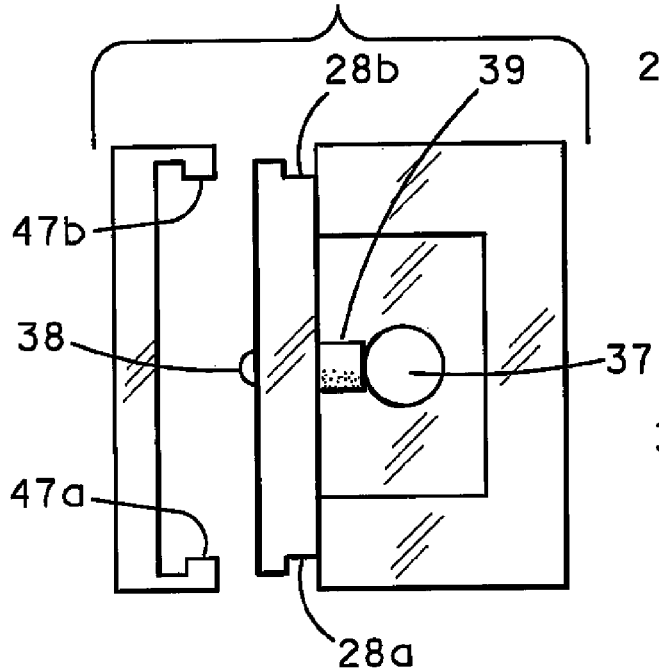
FIG. 5 is an elevated proximal end view of the improved clip with the concealing cap disassociated. And, FIG. 6 is an elevated proximal end view of the improved clip fully assembled.
Figure 6:
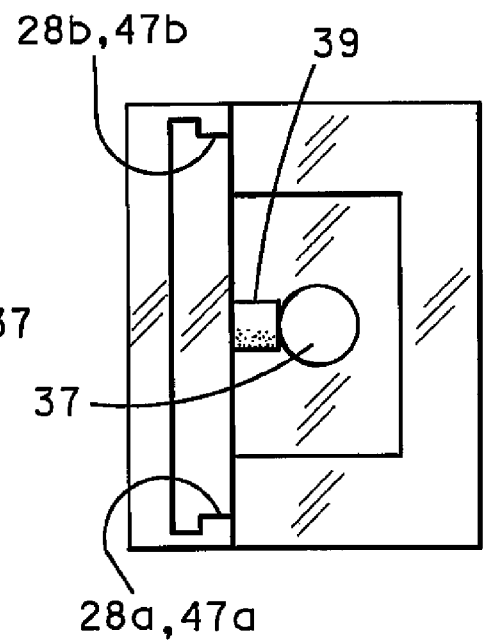

To assist in maintaining the integrity of the assembled and functioning clip 10, the grooved planar element 12 is preferably fitted with a spring-biased pin 38 extending above the outer surface 22a and near the proximal end 16a of planar element 12. The pin 38 is held in a housing 39 which is evident in FIG. 4. The concealing cap 32 is also preferably fitted with a detent 40 in its inner surface 44b positioned to accommodate the extended pin 38 while concealing the pin and the aforementioned fasteners. The spring biased pin 38 extending into the detent 40 assists in maintaining the concealing cap in a semi-secured position over the outer surface 22a of planar element 12.

To effect disassembly of clip 10 for any reason, concentrated or focused lateral, distal force on the concealing cap 32 will result in the disengagement of the pin 38 from the detent 40 and allow the removal of the cap 32 from the clip 10 and expose and permit access to the fasteners for disassembly of the clip.

Glass clips according to the claimed invention can be fashioned from any of a variety of metals and configured by molding or machining into the requisite elements and assembled according to the dictates of the invention. Because the primary purpose of the concealing cap is to hide or conceal mundane mechanical necessities like fasteners, it should not be unexpected that the preferred glass clips will be fabricated from elements with polished or meticulously finished surfaces.

While the foregoing is a detailed and complete description of the preferred embodiments of the disclosed glass clip and its use in supporting plate glass as a structural and aesthetic enhancement in an architectural context, it should be apparent that numerous variations and modifications can be made and employed to implement the overall purpose of the disclosed clip without deviating or departing from the spirit of the invention, which is fairly defined by the appended claims.

The invention claimed is:

1. A glass clip for the attachment of a sheet of plate glass to a stable structure which comprises:
   a pair of opposed planar elements each having proximal and distal ends, inner and outer surfaces and a pair of lateral edges, and wherein the pair of lateral edges of one of said planar elements are grooved and wherein that planar element has at least one perpendicular hole through said element near its proximal end for insertion and use of a fastener, and a spring biased pin extending above said outer surface;
   an attachment means joined to at least one of said planar elements and positioned between the proximal ends of said planar elements separating said elements by a predetermined distance providing a shoulder having a transverse hole for the insertion of a fastener for the attachment of said clip to said stable structure; and
   wherein the improvement in said glass clip comprises: a concealing cap having a topside, an underside having a detent positioned to accommodate said spring biased pin, proximal and distal ends and a pair of lateral edges, said cap conforming generally to the dimensions of said grooved planar element and wherein said lateral edges are configured to mate with said grooves of said grooved planar element to permit said cap to slidably envelope said element and thereby conceal the existence of said fastener.

2. The glass clip according to claim 1 further including a pair of resilient pads generally positioned on the inner surfaces of said planar elements.

3. The glass clip according to claim 1 wherein all paired lateral edges are parallel.

* * * * *